United States Patent [19]
Kawaguchi et al.

[11] Patent Number: 5,888,917
[45] Date of Patent: Mar. 30, 1999

[54] GLASS SUBSTRATE FOR PLASMA DISPLAY PANEL

[75] Inventors: Toshiyasu Kawaguchi; Seiji Miyazaki, both of Yokohama, Japan

[73] Assignee: Asahi Glass Company Ltd., Tokyo, Japan

[21] Appl. No.: 878,624

[22] Filed: Jun. 19, 1997

[30] Foreign Application Priority Data

Jun. 20, 1996 [JP] Japan .................................... 8-160208

[51] Int. Cl.⁶ ........................... C03C 3/085; C03C 3/087
[52] U.S. Cl. .................. 501/70; 501/69; 501/71
[58] Field of Search .............................. 501/69, 70, 904, 501/905, 71

[56] References Cited

U.S. PATENT DOCUMENTS 3,779,733 12/1973 Janakirama-Rao ........................ 501/70
4,521,524 6/1985 Yamashita ................................. 501/60
5,145,805 9/1992 Tarumi et al. ........................... 501/905
5,380,685 1/1995 Morimoto et al. ........................ 501/70
5,599,754 2/1997 Maeda et al. .
5,631,195 5/1997 Yanagisawa et al. .

FOREIGN PATENT DOCUMENTS

WO 96/11887 4/1996 WIPO .

*Primary Examiner*—Michael Marcheschi
*Attorney, Agent, or Firm*—Oblon, Spivak, McClelland, Maier & Neustadt, P.C.

[57] ABSTRACT

A glass substrate for plasma display panel, which has a spectral transmittance of at least 87% in the range of from 400 nm to 700 nm at a thickness in the range of from 1.5 to 3.5 mm.

12 Claims, No Drawings

GLASS SUBSTRATE FOR PLASMA DISPLAY PANEL

BACKGROUND OF THE INVENTION

1. Field of the Invention

The present invention relates to a glass substrate for plasma display panel.

2. Description of the Prior Art

Heretofore, a plate-like glass formed by float process, having a thickness of from 1.5 to 3.5 mm, particularly soda lime glass, has been used as a glass substrate for plasma display panel. The glass formed by float process is suitable for mass production, and has an excellent smoothness. Thus, in these respects, it is suitable as a glass substrate for plasma-display panel.

However, this glass has inherent coloring. That is, it has an absorption in a visible ray wavelength range, which becomes a bar to improvement of contrast and luminance of image display.

Particularly, soda lime silica glass formed by float process has an absorption peak at a near infrared ray wavelength in the vicinity of 1,000 nm, and the absorption peak is extended to the visible ray wavelength range. Therefore, this glass is colored in a range of from green to blue.

SUMMARY OF THE INVENTION

The present invention provides a glass substrate for plasma display, which has a high luminance and is less colored, thereby solving the above-mentioned problems including a problem on display. Also, the present invention provides a glass substrate for plasma display, which has a high contrast on display.

That is, the present invention relates to a glass substrate for plasma display, which has a spectral transmittance of at least 87% in the range of from 400 nm to 700 nm at a thickness in the range of from 1.5 to 3.5 mm, particularly to the glass substrate for plasma display according to claim 1, wherein its glass composition comprising:

| | wt % |
|---|---|
| $SiO_2$ | 50 to 72, |
| $Al_2O_3$ | 0 to 15, |
| $R_2O$ | 6 to 24 (R:Li, Na or K) and |
| R'O | 6 to 24 (R':Mg, Ca, Sr, Ba or Zn), | and a bivalent iron oxide content is at most 0.02 wt % in terms of FeO.

Further, the present invention relates to a glass substrate for plasma display, wherein its glass composition comprising:

| | wt % |
|---|---|
| $SiO_2$ | 50 to 72, |
| $Al_2O_3$ | 0 to 15, |
| $R_2O$ | 6 to 24 (R:Li, Na or K) and |
| R'O | 6 to 24 (R':Mg, Ca, Sr, Ba or Zn), | and a bivalent iron oxide content is at most 0.02 wt % in terms of FeO, and at least one member of from 0 to 150 ppm by weight of CoO and from 0 to 1,200 ppm by weight of NiO is contained to reduce a spectral transmittance at 520 nm.

DETAILED DESCRIPTION OF THE INVENTION

One embodiment of the present invention is a glass substrate for plasma display panel, which has a spectral transmittance of at least 87% in the range of from 400 nm to 700 nm at a thickness in the range of from 1.5 to 3.5 mm. When such a glass plate is used as a substrate in the image display side of plasma display panel, the lowering of luminance and the coloring of the plasma display can be avoided. The glass substrate is used as a substrate in the image display side of plasma display, but may be used on the opposite side of the image display side.

It is almost unavoidable that iron is incorporated as an impurity into glass during commercial production, and it is usual that an iron oxide is incorporated into glass in a total amount of about 0.08 wt % in terms of $Fe_2O_3$. The iron oxide in the glass is present in the forms of a bivalent ion and a trivalent ion, and these ions respectively have specific inherent absorptions in the visible light wavelength range. As mentioned above, an ordinary soda lime silica glass has an absorption peak at a near infrared ray wavelength in the vicinity of 1,000 nm, and this is due to the presence of a ferrous oxide (bivalent iron ion).

In the present invention, a bivalent iron oxide content is controlled to preferably at most 0.02 wt %, more preferably 0.015 wt %, in terms of FeO. By this control of the iron oxide content, a spectral transmittance in the range of from 400 nm to 700 nm of the glass can be easily made at least 87%.

A ferric oxide (trivalent iron ion) has a peak in the vicinity of 380 nm, and lowers a transmittance of a light having a wavelength shorter than 500 nm and causes yellow coloring. Accordingly, it is preferable to control the trivalent iron ion content in the same manner as in the bivalent iron ion content.

It is preferable to control the total iron content in terms of $Fe_2O_3$ to at most 0.06 wt %. More preferably, the above total iron content is controlled to at most 0.05 wt %.

The control of the bivalent iron content can be carried out by adjusting the ion state of an iron oxide material contained, in addition to the control of the total iron content. The ion state of the iron oxide material is largely influenced by basicity of glass and melting conditions including oxygen concentration in melted glass. Concretely, the ratio of the bivalent iron content in the total iron and also the absolute amount of the bivalent iron can be reduced by adding an oxidant such as cerium oxide or sodium nitrate in an appropriate amount (usually at most 2 wt %). In such a case, the weight ratio of bivalent iron ion/total iron ion preferably can be reduced to at most 20%.

An oxidant such as $As_2O_3$ or $Sb_2O_3$ used as a refining agent during melting glass can be utilized as it is without additionally incorporating a oxidant into the glass composition. However, when such a refining agent is used, a great care must be taken since it is liable to react with metallic tin in a float bath and the glass is liable to be hardly formed by float process.

The matrix composition of the substrate glass preferably comprises:

| | wt % |
|---|---|
| $SiO_2$ | 50 to 72, |
| $Al_2O_3$ | 0 to 15, |
| $R_2O$ | 6 to 24 (R:Li, Na or K) and |
| R'O | 6 to 24 (R':Mg, Ca, Sr, Ba or Zn). |

When the substrate glass consists essentially of the above components, a substrate glass having a strain point of at least 550° C. and an average thermal expansion coefficient of from $70\times10^{-7}$ to $90\times10^{-7}/°C$. at a temperature of from 0° to 300° C. can be obtained. The glass substrate having a strain point of at least 550° C. is preferable since it hardly causes irregular heat deformation and heat shrinkage at a baking step during producing a substrate for plasma display panel. Also, the substrate glass having a thermal expansion coefficient of from $70\times10^{-7}$ to $90\times10^{-7}/°C$. at a temperature of from 0° to 300° C. matches with a thermal expansion coefficient of a glass frit usually used as a member for a plasma display panel and accordingly it hardly causes any inconvenience including deformation during producing the plasma display panel.

Also, in order to improve meltability, refinability and forming property, $SO_3$, F or Cl may be incorporated into a substrate glass in the total amount of at most 2 wt %. Further, in order to improve chemical durability, $B_2O_3$, $ZrO_2$, $La_2O_3$, $TiO_2$, $SnO_2$ or ZnO may be incorporated into a substrate glass in the total amount of at most 5 wt %.

Another embodiment of the present invention is a glass substrate for plasma display panel, having the above matrix composition, wherein a bivalent iron oxide content is at most 0.02 wt % in terms of FeO and at least one member of from 0 to 150 ppm by weight of CoO and from 0 to 1,200 ppm by weight of NiO is contained, thereby reducing a spectral transmittance at 520 nm.

According to the first embodiment of the substrate glass, since a light transmittance is high, a plasma display having a high luminance can be obtained. However, in case that an emission efficiency of a phosphor used for a plasma display panel is high, a contrast ratio is liable to be lowered when the light transmittance of the substrate glass is high.

On the other hand, the second embodiment of substrate glass has the same glass matrix composition as mentioned above, and contains at least one member of from 0 to 150 ppm by weight of CoO and from 0 to 1,200 ppm by weight of NiO, thereby lowering a spectral transmittance at 520 nm. In such a case, even when a phosphor used for a plasma display panel has a high emission efficiency, a contrast ratio of display can be maintained satisfactorily high. The spectral transmittance at 520 nm is preferably from at least 45% to less than 85%, more preferably from at least 45% to less than 80% at a thickness in the range of from 1.5 to 3.5 mm. The CoO content is preferably from 15 to 110 ppm by weight, and the NiO content is preferably from 100 to 1,100 ppm by weight.

NiO and CoO absorb lights of mutually complementary colors. Thus, by appropriately adjusting the contents of the two components, a light transmittance can be lowered without causing undesired coloring. In view of this point, the weight ratio of NiO/CoO is preferably adjusted to from 5 to 15, more preferably from 6 to 12.

Also, in the second embodiment of the substrate glass of the present invention, since a bivalent iron oxide content calculated in terms of FeO is controlled to at most 0.02 wt %, preferably to at most 0.015 wt %, there are caused no absorptions in the ultraviolet ray range and in the near infrared ray range in the same manner as in the first embodiment of the substrate glass.

Further, since a trivalent iron ion has an absorption peak in the vicinity of 380 nm, the total iron content calculated in terms of $Fe_2O_3$ should preferably be controlled to at most 0.06 wt %, more preferably at most 0.05 wt %, in the same manner as in the first embodiment.

EXAMPLES

Each component of the starting materials was mixed so as to provide a target composition, and the resultant mixture was melted at a temperature of about 1,500° C. in a platinum crucible. Thereafter, the melted glass was cast and formed into a plate-like. The sample thus obtained was gradually cooled and was then measured with regard to a spectral transmittance in the range of from 400 to 700 nm at an interval of 100 nm.

The following Tables 1 and 2 illustrate the glass compositions thus obtained, their thicknesses and spectral transmittances in the range of from 400 to 700 nm. The matrix glass compositions A to D illustrated in Tables 1 and 2 are shown in the following Table 3. All the iron oxide contents in Tables 1 and 2 are values calculated in terms of $Fe_2O_3$.

In Table 2, Examples 10 and 11 are comparative examples. In Examples 1 to 9, spectral transmittances in the range of from 400 to 700 nm were at least 88%. Since the iron oxide contents were large in Examples 10 and 11, spectral transmittances at 700 nm were lowered.

On the other hand, the following Table 4 illustrates the glass compositions having transmittances at 550 nm lowered by NiO and CoO, their thicknesses and the spectral transmittances at 550 nm. In Examples 13 and 14, the spectral transmittances at 550 nm were reduced to lower than 87% by adding NiO and CoO. Accordingly, even when a plasma display panel contains a light-emitting material having a high luminance, a high contrast ratio can be obtained.

TABLE 1

|  | Examples | | | | | |
|---|---|---|---|---|---|---|
|  | 1 | 2 | 3 | 4 | 5 | 6 |
| Matrix glass composition | A | A | A | A | A | B |
| Thickness (cm) | 0.28 | 0.20 | 0.15 | 0.30 | 0.22 | 0.28 |
| Total iron oxide content (wt %) | 0.06 | 0.06 | 0.06 | 0.04 | 0.04 | 0.05 |
| $Fe_2O_3$ (wt %) | 0.037 | 0.037 | 0.037 | 0.021 | 0.021 | 0.034 |
| FeO (wt %) | 0.016 | 0.016 | 0.016 | 0.013 | 0.013 | 0.011 |
| Spectral transmittance (%) | | | | | | |
| 400 nm | 90.0 | 90.6 | 91.0 | 90.7 | 91.1 | 90.3 |
| 500 nm | 91.0 | 91.3 | 91.4 | 91.0 | 91.3 | 91.3 |
| 600 nm | 90.3 | 90.8 | 91.1 | 90.3 | 90.9 | 91.9 |
| 700 nm | 88.0 | 89.1 | 89.8 | 87.9 | 89.2 | 89.2 |

TABLE 2

| Examples | 7 | 8 | 9 | 10 | 11 |
|---|---|---|---|---|---|
| Matrix glass composition | B | C | C | A | D |
| Thickness (cm) | 0.32 | 0.18 | 0.26 | 0.28 | 0.20 |
| Total iron oxide content (wt %) | 0.05 | 0.06 | 0.04 | 0.10 | 0.12 |
| $Fe_2O_3$ (wt %) | 0.033 | 0.036 | 0.024 | 0.057 | 0.073 |
| FeO (wt %) | 0.012 | 0.017 | 0.011 | 0.030 | 0.033 |
| Spectral transmittance (%) | | | | | |
| 400 nm | 90.0 | 90.8 | 90.8 | 89.1 | 89.0 |
| 500 nm | 91.1 | 91.3 | 91.3 | 90.0 | 90.3 |
| 600 nm | 90.5 | 90.8 | 90.9 | 88.8 | 89.0 |
| 700 nm | 88.6 | 89.3 | 89.4 | 84.7 | 85.5 |

TABLE 3

| Matrix glass composition (wt %) | A | B | C | D |
|---|---|---|---|---|
| $SiO_2$ | 58 | 65 | 60 | 72.5 |
| $Al_2O_3$ | 7 | 4 | 15 | 2 |
| $B_2O_3$ | — | — | 1 | — |
| $Na_2O$ | 4 | 2 | 4 | 13.3 |
| $K_2O$ | 6.5 | 14 | 11 | 0.3 |
| MgO | 2 | 4.5 | 4 | 3.7 |
| CaO | 5 | 7 | 5 | 8.2 |
| SrO | 7 | — | — | — |
| BaO | 7.5 | — | — | — |
| $ZrO_2$ | 3 | 3.5 | — | — |

TABLE 4

| Examples | 12 | 13 | 14 |
|---|---|---|---|
| Matrix glass composition | A | A | A |
| Thickness (cm) | 0.20 | 0.28 | 0.20 |
| Total iron oxide content (wt %) | 0.06 | 0.06 | 0.06 |
| $Fe_2O_3$ (wt %) | 0.037 | 0.037 | 0.037 |
| FeO (wt %) | 0.016 | 0.016 | 0.016 |
| NiO (wt %) | 0 | 330 | 1050 |
| CoO (wt %) | 0 | 35 | 100 |
| Spectral transmittance (%) | | | |
| 550 nm | 90.5 | 70 | 45 |

According to the present invention, a glass substrate for plasma display panel having a high luminance and causing no coloring problem in display can be provided. Also, according to the present invention, a glass substrate for plasma display having a high contrast in display can be provided.

What is claimed is:

1. A glass substrate, which is formed by the float process, for a plasma display panel, which has a spectral transmittance of at least 87% in the range of from 400 nm to 700 nm at a thickness in the range of from 1.5 to 3.5 mm, wherein the glass substrate comprises:

| | wt % |
|---|---|
| $SiO_2$ | 50 to 72, |
| $Al_2O_3$ | 0 to 15, |
| $R_2O$ | 6 to 24, and |
| R'O | 6 to 24, | wherein R is an alkali metal selected from the group consisting of Li, Na and K and $R^1$ is a metal selected from the group consisting of Mg, Ca, Sr, Ba and Zn, and a bivalent iron oxide of at most 0.02 wt % in terms of FeO.

2. A glass substrate formed by the float process for a plasma display panel, wherein the glass substrate comprises:

| | wt % |
|---|---|
| $SiO_2$ | 50 to 72, |
| $Al_2O_3$ | 0 to 15, |
| $R_2O$ | 6 to 24, and |
| R'O | 6 to 24, | wherein R is an alkali metal selected from the group consisting of Li, Na and K and $R^1$ is a metal selected from the group consisting of Mg, Ca, Sr, Ba and Zn, and a bivalent iron oxide content of at most 0.02 wt % in terms of FeO, and at least one material which reduces the spectral transmittance of the glass at 520 nm, said material being selected from the group consisting of from 0 to 150 ppm by weight of CoO and from 0 to 1200 ppm by weight of NiO.

3. The glass substrate for plasma display according to claim 1, wherein the bivalent iron oxide content is at most 0.015 wt % in terms of FeO.

4. The glass substrate for a plasma display panel according to claim 1, wherein the content of all iron oxide in the glass substrate is at most 0.06 wt % in terms of $Fe_2O_3$.

5. The glass substrate for a plasma display panel according to claim 4, wherein the content of all iron oxide in the glass substrate is at most 0.05 wt % in terms of $Fe_2O_3$.

6. The glass substrate for plasma display according to claim 2, wherein CoO is present in an amount of from 15 to 110 ppm by weight.

7. The glass substrate for plasma display according to claim 2, wherein NiO is present in an amount of from 100 to 1,100 ppm by weight.

8. The glass substrate for plasma display according to claim 2, wherein NiO and CoO are present in an NiO/CoO weight ratio of from 5 to 15.

9. The glass substrate for plasma display according to claim 2, wherein NiO and CoO are present in an NiO/CoO weight ratio of from 6 to 12.

10. The glass substrate for plasma display according to claim 2, wherein the spectral transmittance at 520 nm measured at a thickness in the range of from 1.5 to 3.5 mm is from 45 to 85%.

11. The glass substrate for plasma display according to claim 2, wherein the spectral transmittance at 520 nm measured at a thickness in the range of from 1.5 to 3.5 mm is from 45 to 80%.

12. The glass substrate for a plasma display device according to claim 1, wherein the bivalent iron oxide content ranges from 0.011 to 0.02 wt %.

* * * * *